United States Patent
Yoshitsugu et al.

(10) Patent No.: US 7,539,901 B2
(45) Date of Patent: May 26, 2009

(54) DATA TRANSMISSION MANAGEMENT SYSTEM, A MOBILE DEVICE AND A SERVER USED THEREIN

(75) Inventors: Hirotaka Yoshitsugu, Ichikawa (JP); Hirohito Taniguchi, Settsu (JP)

(73) Assignee: NTT DoCoMo, Inc., Tokyo (JP)

( * ) Notice: Subject to any disclaimer, the term of this patent is extended or adjusted under 35 U.S.C. 154(b) by 465 days.

(21) Appl. No.: 11/353,177

(22) Filed: Feb. 14, 2006

(65) Prior Publication Data
US 2006/0195727 A1     Aug. 31, 2006

(30) Foreign Application Priority Data
Feb. 17, 2005   (JP) .............................. 2005-041104

(51) Int. Cl.
*G06F 11/00* (2006.01)
(52) U.S. Cl. .......................................... 714/38; 370/278
(58) Field of Classification Search ................... 714/38; 370/278
See application file for complete search history.

(56) References Cited

U.S. PATENT DOCUMENTS 6,407,680 B1 * 6/2002 Lai et al. ...................... 341/50
6,697,969 B1   2/2004 Merrian
2003/0084184 A1 5/2003 Eggleston et al.

FOREIGN PATENT DOCUMENTS

| JP | 8-125779 | 5/1996 |
| JP | 2000-32176 | 1/2000 |
| JP | 2000-032176 | * 1/2000 |

* cited by examiner

*Primary Examiner*—Michael C Maskulinski
(74) *Attorney, Agent, or Firm*—Oblon, Spivak, McClelland, Maier & Neustadt, P.C.

(57) ABSTRACT

A data transmission control system includes a server configured to store an application program having a data area in which transmission control information containing a threshold value used to detect abnormal data transmission is stored and to allow the application program to be downloaded in response to a request, and a mobile device that downloads the application program from the server. The mobile device comprises a management table recording the transmission control information extracted from the downloaded application program; a counter configured to count a number of messages or traffic volume per unit time; a detector configured to compare the counted value with the threshold value contained in the transmission control information to detect abnormal data transmission; and a transmission regulating unit configured to restrict data transmission upon detection of the abnormal data transmission.

13 Claims, 8 Drawing Sheets

FIG.2

THRESHOLD INFORMATION FOR DETECTION OF ABNORMAL TRANSMISSION — 21

- TRAFFIC VOLUME OF DATA COMMUNICATION
- UNIT TIME (FOR TRAFFIC VOLUME)
- MESSAGE COUNTS
- UNIT TIME (FOR MESSAGE COUNTS)
- OPERATION TO BE CARRIED OUT UPON DETECTION OF ABNORMAL TRANSMISSION

FIG.3

| F1 | F2 | F3 | F4 | F5 | F6 | F7 | F8 |
|---|---|---|---|---|---|---|---|
| | TRAFFIC VOLUME OF DATA COMMUNICATION | UNIT TIME (FOR TRAFFIC VOLUME) | MESSAGE COUNTS OF DATA COMMUNICATION | UNIT TIME (FOR MESSAGE COUNTS) | OPERATION TO BE CARRIED OUT | CURRENT TRAFFIC VOLUME OF DATA COMMUNICATION | CURRENT MESSAGE COUNTS OF DATA COMMUNICATION |
| i-appli A | 2000Kb | 1h | 5 | 1m | REPORT TO ×× | | |
| i-appli B | 300Kb | 30m | 1000 | 1h | REPORT TO ×× DELETE APPLI | | |
| i-appli C | 50b | 15h | 200 | 20m | – | | |

522

DATA TRANSMISSION MANAGEMENT SYSTEM, A MOBILE DEVICE AND A SERVER USED THEREIN

FIELD OF THE INVENTION

The present invention relates to a data transmission management technique for preventing a high amount of data communication fee from being charged to users due to freezing or hang-up (endless iterations) of application programs caused by bugs and resulting in meaningless data transmission.

BACKGROUND OF THE INVENITON

Mobile devices typified by mobile cellular phones have been designed so as to be capable of making use of various application programs, such as JAVA® applications. Users can download application programs from a server to the mobile devices and execute various operations including data communications with arbitrary servers.

Such application programs may includes bugs, and in fact, many cases have been reported where abnormal data transmission has occurred due to freezing or hang-up (endless iterations) of application programs caused by bugs and resulting in meaningless data transmission, or where a huge amount of data communication fees are billed to users. As long as it is established that the factors of such errors reside on the side of the venders offering the application programs, the vendors may bear the communication fees. However, if such errors are caused by unknown reasons, communication fees are likely to be charged to individual users. This problem is becoming a social issue.

Japanese Patent Laid-open Publication No. 8-125779 discloses a system for preventing a high amount of fees from being imposed on users in LAN access from a LAN device to a network (e.g., ISDN). In this publication, if "invalid access", such as endless repetition of a specific pattern file continues over a prescribed time period designated by a user, the connection is automatically cut off.

Another publication, Japanese Patent Laid-open Publication No. 2000-32176 also discloses a method for preventing a high amount of communication charges from being billed to a user. In this publication, every time a line is disconnected, the communication fee is stored and accumulated. If the accumulated amount of data communication fees reaches a prescribed amount set per month by the user, no more data communication is allowed in that month.

The techniques disclosed in both publications can prevent a high amount of fees from being charged to users; however, the transmission control is performed only at the user devices. Accordingly, users have to purchase particular hardware or software and set parameters, such as "time" or "amount", by themselves.

In addition, depending on information type, there may be data items that users do not want to stop transmission of even if the communication fee exceeds the prescribed level, and for other data items, users may want to cut off the connection at an earlier stage. The prior art techniques disclosed in the above-described publications perform only a fixed control, and cannot deal with flexible control according to information types.

Another problem of the prior art techniques in which communication control solely relies upon user devices is that if abnormal transmission is caused by bugs contained in an application program downloaded from a server, there are no means for reporting the bugs or the abnormal transmission. This means that appropriate measures (such as modification of the program) are delayed.

SUMMARY OF THE INVENTION

The present invention was conceived in view of the above-described problems in the prior art, and it is an object of the invention to provide a data communication management technique that can regulate undesirable data transmission in a flexible manner depending on application types, without imposing extra workload (such as setting parameters) on users, thereby preventing a high amount of data communication charges from being billed to the users. The technique includes novel structures of a data communication management system, a mobile device, and a server, as well as a mobile device control program and an application program.

It a preferred embodiment, abnormal operations due to bugs or other factors are automatically reported to the developer of the application programs so as to allow prompt measures including modification of the programs to be taken.

In one aspect of the invention, a data transmission control system includes:
(a) a server configured to store an application program having a data area in which transmission control information containing a threshold value used to detect abnormal data transmission is stored and to allow the application program to be downloaded in response to a request; and
(b) a mobile device that comprises:
 a management table recording the transmission control information extracted from the downloaded application program;
 a counter configured to count the number of messages or traffic volume per unit time;
 a detector configured to compare the counted value with the threshold value contained in the transmission control information to detect abnormal data transmission; and
 a transmission regulating unit configured to restrict data transmission upon detection of the abnormal data transmission.

In another aspect of the invention, a mobile device comprises:
(a) a download controller configured to download an application program containing transmission control information from a server;
(b) a management table configured to record the transmission control information extracted from the downloaded application program;
(c) a counter configured to count the number of messages or traffic volume per unit time;
(d) a detector configured to compare the counted value with the threshold value contained in the transmission control information to detect abnormal data transmission; and
(e) a transmission regulating unit configured to restrict data transmission upon detection of the abnormal data transmission.

In still another aspect of the invention, a program product for a mobile device is provided. The program product is installed in the mobile device and causes the mobile device to perform the process of:
(a) extracting transmission control information from an application program downloaded from a server;
(b) recording the transmission control information in association with the application program in a management table;
(c) counting the number of messages or traffic volume per unit time upon generation of a transmission request;

(d) comparing the counted value with a threshold value contained in the transmission control information to detect abnormal data transmission; and (e) restricting data transmission upon detection of the abnormal data transmission.

In yet another aspect of the invention, a server is provided. The server comprises:

(a) a receiving unit configured to receive a report of abnormal data transmission having occurred during execution of an application program at a mobile device; and (b) a storage unit configured to store the abnormal data transmission report in association with the application program.

As a preferred embodiment, the server may further comprise:

(c) a download controller configured to allow the application program to be downloaded to the mobile device in response to a request from the mobile device, wherein the application program contains transmission control information including a threshold value used to detect the abnormal data transmission.

With the above-described arrangements, data transmission can be appropriately restricted when abnormal data transmission has occurred at a mobile device due to freezing or hang-up of (endless iteratoin) an application program caused by bugs and resulting in meaningless data transmission, and consequently, an unreasonably high amount of communication fees is prevented from being billed to users.

Since the application program to be downloaded to a mobile terminal contains transmission control information, the user does not have to install extra information in the mobile device.

In addition, because abnormal data transmission is automatically reported to the server, prompt measures for modifying the programs can be taken.

BRIEF DESCRIPTION OF THE DRAWINGS

Other features and advantages of the invention will become more apparent from the following detailed description when read in conjunction with the accompanying drawings, in which

FIG. 2 illustrates an example of threshold information for detection of abnormal transmission;

FIG. 3 illustrates an example of a management table;

DETAILED DESCRIPTION OF THE PREFERRED EMBODIMENT

The preferred embodiment of the present invention is described below in conjunction with the attached drawings.

Figure 1:
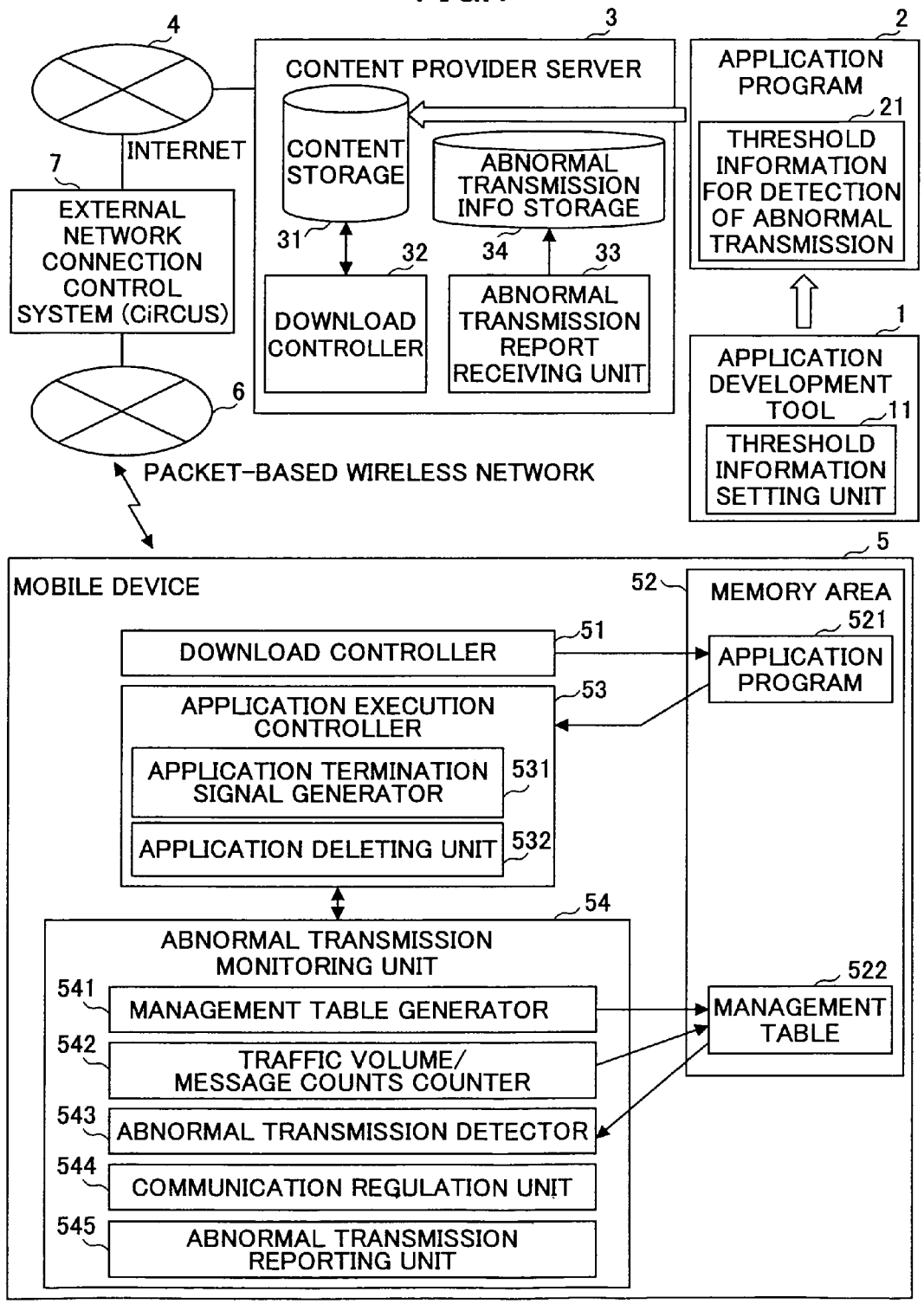
FIG. 1 is a schematic diagram illustrating a data communication management system according to an embodiment of the invention.

FIG. 1 is a schematic diagram illustrating a data communication management system according to an embodiment of the invention. On the content provider side, an application program (for example, JAVA®-based application program) 2 is created using an application development tool 1, and stored in a content storage unit 31 of a content provider server 3.

The application development tool 1 includes a threshold information setting unit 11 that provides threshold information used in abnormal transmission detection to each of the applications. Threshold information defines a data communication traffic volume, the number of messages (message counts), and unit times for the traffic volume and the message counts for each application. Therefore, the created application program has a data area in which the corresponding threshold information 21 to be used for abnormal transmission detection (hereinafter referred to as "abnormal transmission detection threshold information 21") is written.

FIG. 2 illustrates an example of the abnormal transmission detection threshold information 21, which information includes data communication traffic volume, time unit for the traffic volume, message counts, time unit for message counts, and operations to be carried out when abnormal data transmission is detected. For a JAVA® application, the abnormal transmission detection threshold information 21 is described as a pair of a key and a value separated by a symbol "=" in the text file named an application descriptor file (ADF).

Returning back to FIG. 1, the content provider server 3 includes a download controller 32, an abnormal transmission report receiving unit 33, and an abnormal transmission information storage unit 34, in addition to the content storage unit 31. The download controller 32 permits an application program stored in the content storage unit 31 to be downloaded in response to a request. The abnormal transmission report receiving unit 33 receives an abnormal transmission report indicating occurrence of abnormal data transmission during execution of an application program. The abnormal transmission information storage unit 34 extracts abnormal transmission occurrence information from the received abnormal transmission report, and stores the extracted information.

In this system, a packet-based wireless network 6 is connected to the Internet 4 via an external network connection control system 7. An example of the external network connection control system 7 is CiRCUS (treasure Casket of i-mode (registered trademark) service, high Reliability platform for CUStomer).

The system also includes a mobile device 5. The mobile device 5 has a download controller 51, an application execution controller 53, and an abnormal transmission monitoring unit 54. The download controller 51 downloads an application program from the content provider server 3, and stores it the memory area 52. The application program stored in the memory area is referred to as "application program 521". The application execution controller 53 reads and executes the application program 521. The abnormal transmission monitoring unit 54 monitors whether abnormal data transmission has occurred during execution of the application program 521.

The application execution controller 53 has an application termination signal generator 531 and an application deleting unit 532, in addition to the ordinary executing function for executing application program 521. The application termination signal generator 531 generates an application termination signal for terminating the operations of the application program 521 according to the operation designated in the abnormal transmission detection threshold information, upon receiving an abnormal transmission detection message form the abnormal transmission monitoring unit 54. The application deleting unit 532 deletes the application program 521 from the memory area 52 upon receiving the abnormal transmission detection message from the abnormal transmission monitoring unit 54.

The abnormal transmission monitoring unit 54 includes a management table generator 541, a traffic volume/message counts counter 542, an abnormal transmission detector 543, a communication regulation unit 544, and an abnormal transmission reporting unit 545. The management table generator 541 enters the abnormal transmission detection threshold information 21 contained in the downloaded application program 521 into a management table 522 stored in the memory area 52. The traffic volume/message counts counter 542 counts the data transmission traffic volume and the number of messages every unit time designated in the abnormal transmission detection threshold information 21. The abnormal transmission detector 543 compares the counted traffic volume and the number of messages with the threshold values recorded in the management table 522 to detect occurrence of abnormal data transmission. The abnormal transmission reporting unit 545 reports an occurrence of abnormal data transmission, upon detection by the abnormal transmission detector 543, according to the operations designated in the abnormal transmission detection threshold information 21.

FIG. 3 illustrates an example of the management table 522. The management table 522 includes an application entry field F1 for specifying an application, a traffic volume field F2 indicating a traffic volume threshold value, a unit time field F3 indicating a unit time used to count traffic volume, message counts field F4 indicating a message count threshold value, a unit time field F5 indicating a unit time used to count the number of messages, an operation designation field F6 indicating an operation to be carried out when abnormal data transmission is detected, a current traffic volume field F6 recording the current traffic volume of data transmission, and a message counts field F8 storing the current number of messages counted by the counter 542. The information items recorded in fields F2 through F6 are written from the abnormal transmission detection threshold information 21 contained in the application program 2.

Figure 4:
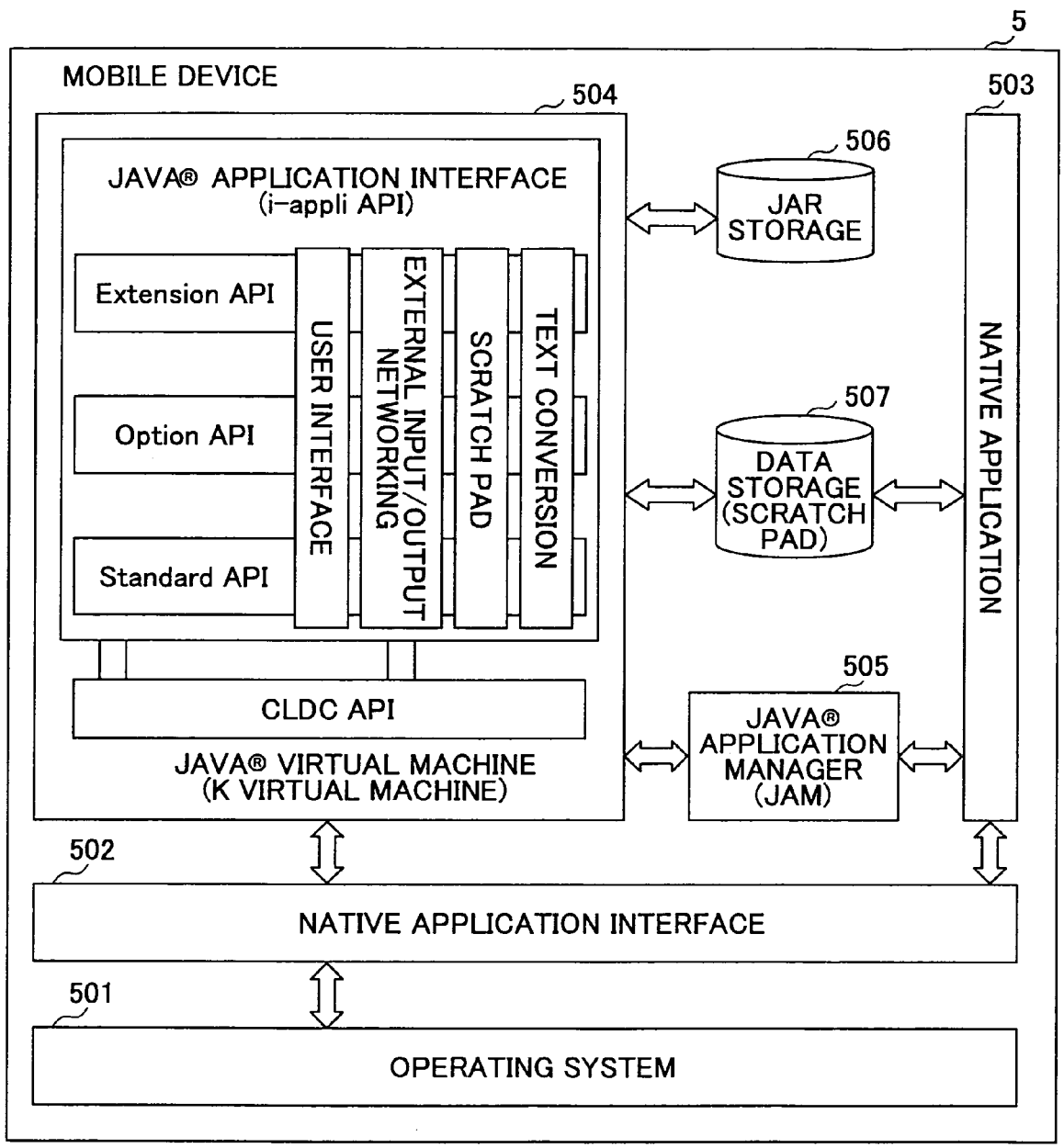
FIG. 4 is a schematic block diagram illustrating a software structure of a mobile device according to an embodiment of the invention.

FIG. 4 is a schematic block diagram illustrating an example of the software structure of the mobile device 5. The software structure includes an operating system 501 serving as a foundation, a native application interface 502 that hierarchically functions above the operating system, and a native application 503 and a JAVA® application interface 504 hierarchically running above the native application interface 502. The structure also includes an JAVA® application manager 505 for managing the operations of application programs, a JAR storage 506 for storing application programs, and a data storage 507 for storing data. The abnormal transmission monitoring unit 54 shown in FIG. 1 may be provided in the JAVA® application manager 505, or alternatively, in the native application 503 or the operating system 501. Whichever is advantageous in implementation can be chosen.

Figure 5:
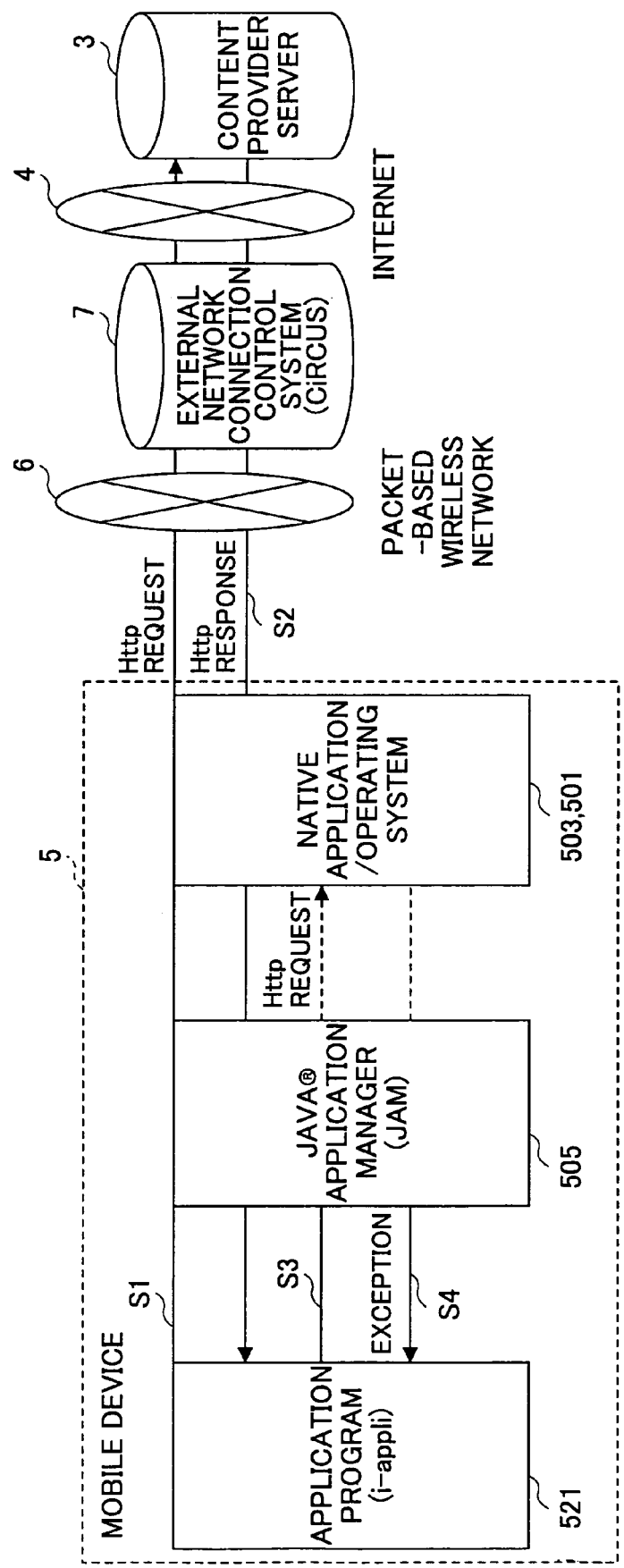
FIG. 5 illustrates an example of abnormal transmission monitoring flow.

FIG. 5 is a schematic diagram illustrating an abnormal transmission monitoring flow in the system. When an Http request addressed to the content provider server 3 is generated by the application program 521 installed in the mobile device 5, the abnormal transmission monitoring unit 54 (FIG. 1) provided in the JAVA® application manger 505, the native application 503 or the operating system 601 starts monitoring occurrence of abnormal data transmission based on the traffic volume per unit time or the number of messages transmitted per unit time. If no abnormal transmission is detected, the Http request is transmitted to the content provider server 3 via the packet-based wireless network 6, the external network connection control system 7 and the Internet 4 (step S1). An Http response is transmitted from the content provider server 3 via the Internet 4, the external network connection control system 7, and the packet-based wireless network 6, to the mobile device 5 (step S2).

On the other hand, if abnormal transmission is detected through monitoring when an Http request from the application program 521 of the mobile device 5 to the content provider server 3 is generated (step S3), an exception is returned from one of the JAVA® application manger 505, the native application 5-3, or the operating system 501 to the application program 521 so as to restrict data transmission (step S4).

Figure 6:
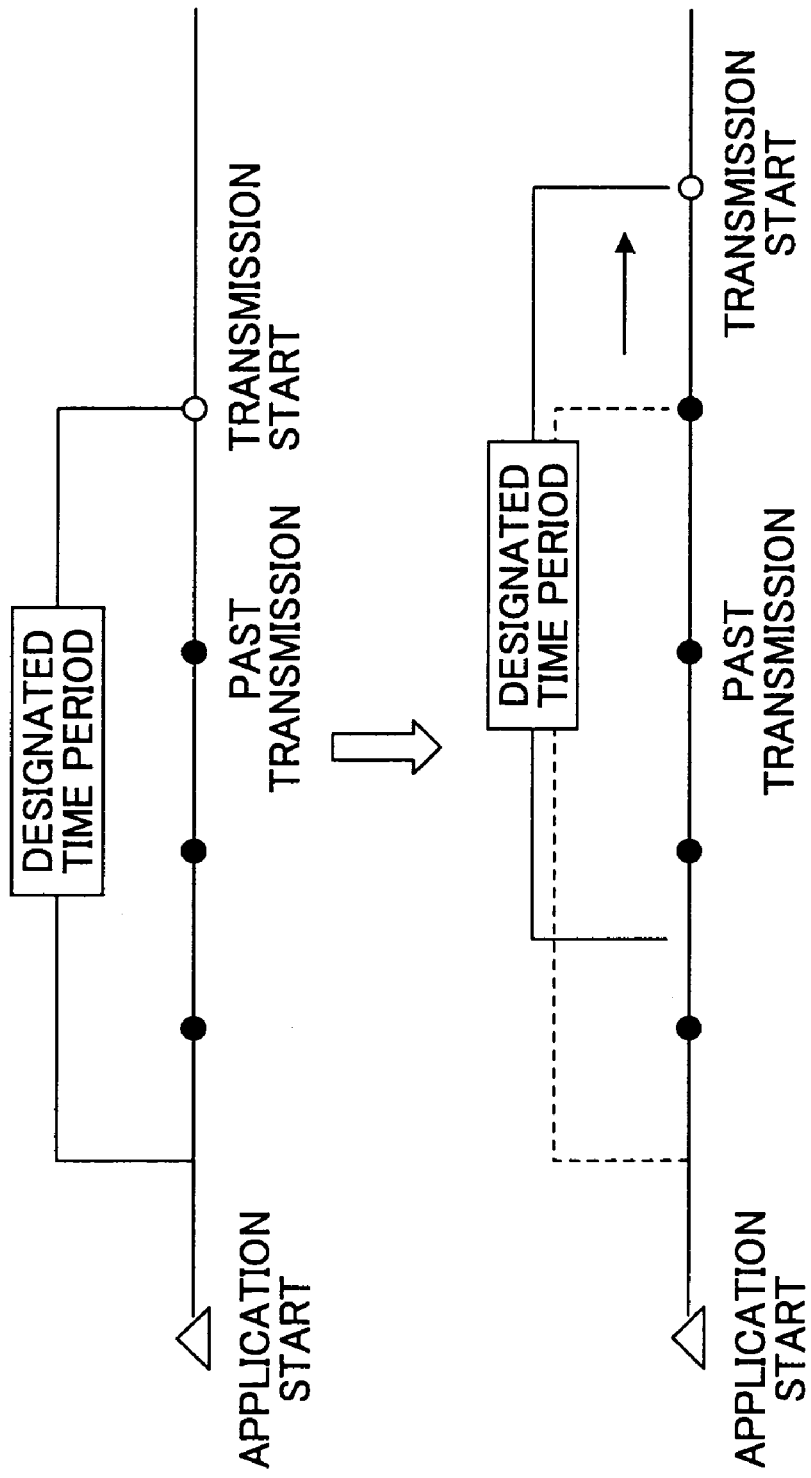
FIG. 6 is a diagram illustrating an example of how the number of messages is counted.
Figure 7:
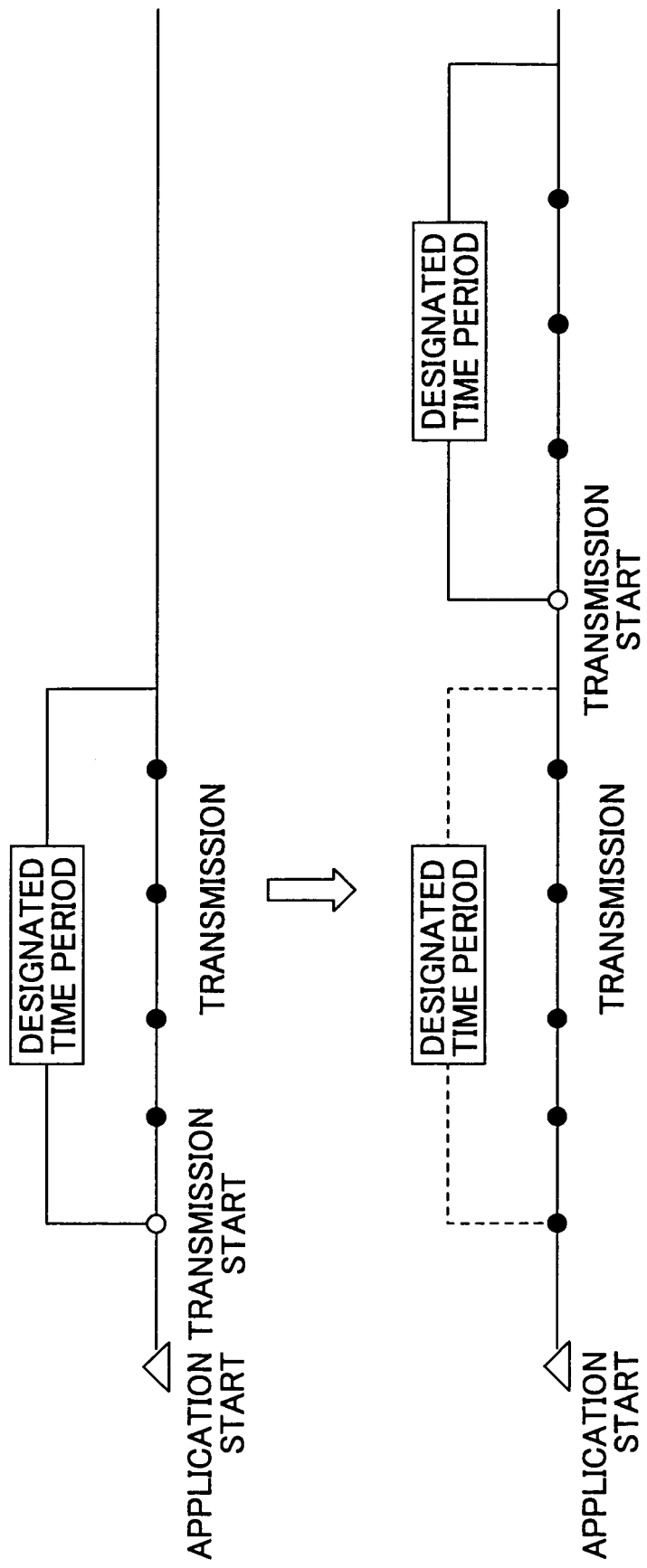
FIG. 7 is a diagram illustrating another example of how the number of messages is counted.
Figure 8:
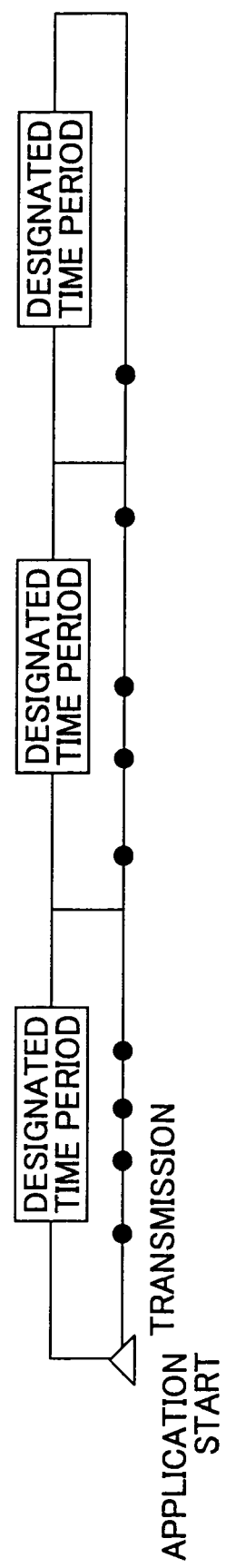
FIG. 8 is a diagram illustrating still another example of how the number of messages is counted.

FIG. 6, FIG. 7 and FIG. 8 illustrate examples showing how the messages are counted. In the example shown in FIG. 6, the number of messages is counted within the unit time from the transmission starting point (that is, from generation of a data transmission request or an Http request) tracking back to the past. Every time a transmission request is generated, the number of messages is counted within the backward unit time period from the current time, while the unit time frame is shifting along the time axis. If the number of messages generated exceeds the threshold, it is determined that error is occurring. The same applies to counting traffic volume.

In the example shown in FIG. 7, if the timer is not activated when a data transmission request (Http request) is generated, the timer is activated to count the number of messages within the unit time (that is, until the time is up). If the counted number of messages does not exceed the threshold value, the time is activated again when the next message (transmission request) is generated. If the number of messages counted within the unit time is over the threshold, it is determined that error transmission has occurred. The same applies to counting traffic volume.

In the example shown in FIG. 8, the number of messages is counted every unit time upon start of the application program. The same applies to counting the traffic volume per unit time.

In this manner, transmission control information is automatically stored in the mobile device 5 when downloading an application program 2 from the content provider server 3, and the transmission control information is managed in association with the corresponding application program in the mobile device 5. With this transmission control information, abnormal data transmission is prevented efficiently without requiring the user to set specific control information in the mobile device 5. The transmission control information is determined and written in each application program by a programmer, taking the characteristic of that application program into account. Accordingly, data transmission can be controlled and regulated for each of the application programs.

The transmission control program may be configured such that a message "Connection is to be cut off because of abnormal operations occurring in software. Please terminate and delete the application" is displayed on the mobile device 5 to prevent the same error from occurring. In addition, the program is configured to report the detection of abnormal transmission to the developer to allow the developer or the provider of the application program to recognize the existence of bugs and to take appropriate measures.

Although the invention has been described based on specific examples, the invention is not limited to the examples. There are many modifications and substitutions apparent for those people with an ordinary skill in the art within the scope of the invention, which is only defined by the appended claims.

This patent application is based on and claims the benefit of the earlier filing date of Japanese Patent Application No. 2005-041104 filed Feb. 17, 2005, the entire contents of which are hereby incorporated by reference.

What is claimed is:

1. A data transmission control system comprising:
   a server configured to store an application program having
      a data area in which transmission control information
      containing a threshold value used to detect abnormal
      data transmission is stored and to allow the application
      program to be downloaded in response to a request; and
   a mobile device including:
      a management table recording the transmission control
         information extracted from the downloaded application program;
      a counter configured to count a number of messages or
         traffic volume per unit time;
      a detector configured to compare the counted value with
         the threshold value contained in the transmission control information to detect abnormal data transmission;
         and
      a transmission regulating unit configured to restrict data
         transmission upon detection of the abnormal data
         transmission.

2. The system of claim 1, wherein the transmission control information includes at least one of an acceptable traffic volume and a number of messages per unit time as the threshold value, as well as a unit time designated for each of the traffic volume and the number of messages.

3. A mobile device comprising:
   a download controller configured to download an application program containing transmission control information from a server;
   a management table configured to record the transmission control information extracted from the downloaded application program;
   a counter configured to count a number of messages or traffic volume per unit time;
   a detector configured to compare the counted value with the threshold value contained in the transmission control information to detect abnormal data transmission; and
   a transmission regulating unit configured to restrict data transmission upon detection of the abnormal data transmission.

4. The mobile device of claim 3, wherein the transmission control information includes at least one of an acceptable traffic volume and a number of messages per unit time as the threshold value, as well as a unit time designated for each of the traffic volume and the number of messages.

5. The mobile device of claim 4, wherein the transmission control information further includes an operation to be carried out when the abnormal data transmission is detected in association with the application program.

6. The mobile device of claim 3, further comprising:
   an application execution controller configured to carry out a prescribed operation upon detection of the abnormal data transmission.

7. The mobile device of claim 6, wherein the transmission control information further includes an operation to be carried out when the abnormal data transmission is detected, and the application execution controller carries out the operation according to the transmission control information upon detection of the abnormal data transmission.

8. The mobile device of claim 3, wherein the counter is configured to count the number of messages or the traffic volume within the unit time from generation of a data transmission request tracking back to a past.

9. The mobile device of claim 3, wherein if the counter is not activated with generation of a data transmission request, the counter is activated to count the number of messages or the traffic volume until the time is up based on elapse of the unit time.

10. The mobile device of claim 3, wherein the counter is configured to count the number of messages or the traffic volume every said unit time from start of the application program.

11. A program product installed in a mobile device and causing the mobile device to perform the process of:
   extracting transmission control information from an application program downloaded from a server;
   recording the transmission control information in association with the application program in a management table;
   counting a number of messages or traffic volume per unit time upon generation of a transmission request;
   comparing the counted value with a threshold value contained in the transmission control information to detect abnormal data transmission; and
   restricting data transmission upon detection of the abnormal data transmission.

12. The program product of claim 11, causing the mobile device to further perform the process of:
   carrying out a prescribed operation defined in the transmission control information upon detection of the abnormal data transmission.

13. A server comprising:
   a receiving unit configured to receive a report of abnormal data transmission, the transmission having occurred during execution of an application program at a mobile device;
   a storage unit configured to store the abnormal data transmission report in association with the application program; and
   a download controller configured to allow the application program to be downloaded to the mobile device in response to a request from the mobile device;
   wherein the application program contains transmission control information including a threshold value used to detect the abnormal data transmission.

* * * * *